United States Patent [19]
Lee et al.

[11] Patent Number: 5,738,493
[45] Date of Patent: Apr. 14, 1998

[54] TURBULATOR CONFIGURATION FOR COOLING PASSAGES OF AN AIRFOIL IN A GAS TURBINE ENGINE

[75] Inventors: Ching-Pang Lee; David B. Knable, both of Cincinnati, Ohio

[73] Assignee: General Electric Company, Cincinnati, Ohio

[21] Appl. No.: 778,596

[22] Filed: Jan. 3, 1997

[51] Int. Cl.$^6$ .................................................. F04D 29/58
[52] U.S. Cl. ........................................ 416/97 R; 415/115
[58] Field of Search ............................. 415/115, 116; 416/96 R, 97 R

[56] References Cited

U.S. PATENT DOCUMENTS

| | | | |
|---|---|---|---|
| 3,628,880 | 12/1971 | Smuland | 416/96 A |
| 4,474,532 | 10/1984 | Pazder | 416/97 R |
| 4,514,144 | 4/1985 | Lee | 416/96 R |
| 4,515,523 | 5/1985 | North et al. | 416/97 R |
| 5,156,526 | 10/1992 | Lee et al. | 416/97 R |
| 5,165,852 | 11/1992 | Lee et al. | 416/97 R |
| 5,232,343 | 8/1993 | Butts | 416/97 R |
| 5,328,331 | 7/1994 | Bunker et al. | 416/97 R |
| 5,423,608 | 6/1995 | Chyou et al. | 366/337 |
| 5,471,316 | 11/1995 | Taslim et al. | 416/97 R |
| 5,611,662 | 3/1997 | Cunha | 416/97 R |

*Primary Examiner*—John T. Kwon
*Attorney, Agent, or Firm*—Andrew C. Hess; Patrick R. Scanlon

[57] ABSTRACT

A turbulator configuration formed on an inner surface of at least one wall of a cooling passage for a rotor blade in a gas turbine engine is disclosed, where the cooling passage has an upstream end, a downstream end, and a longitudinal axis therethrough. The turbulator configuration includes a first set of longitudinally spaced turbulators having a specified height and length for tripping a thermal boundary layer along the cooling passage wall to enhance heat transfer between the coolant and the wall, as well as a second set of longitudinally spaced turbulators having a specified height and length for generating turbulence in a core flow region of the cooling passage to reduce the thickness of the thermal boundary layer downstream therefrom.

18 Claims, 6 Drawing Sheets

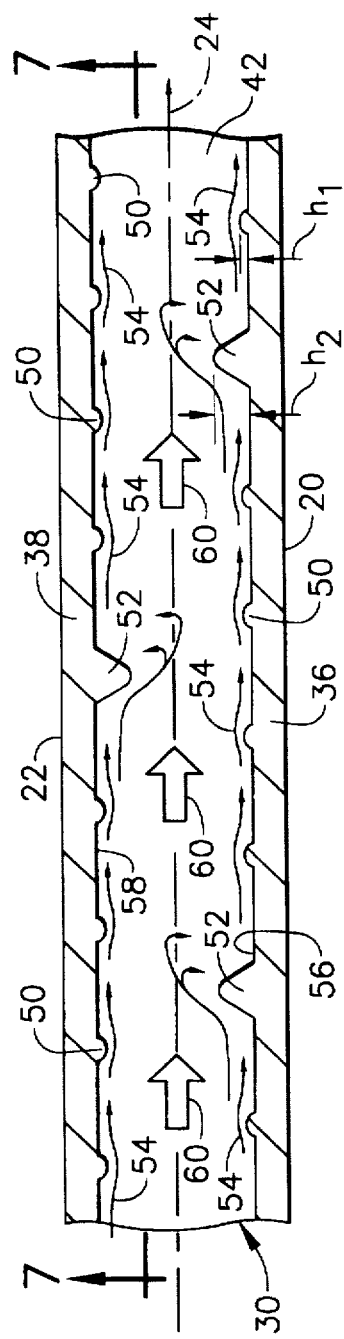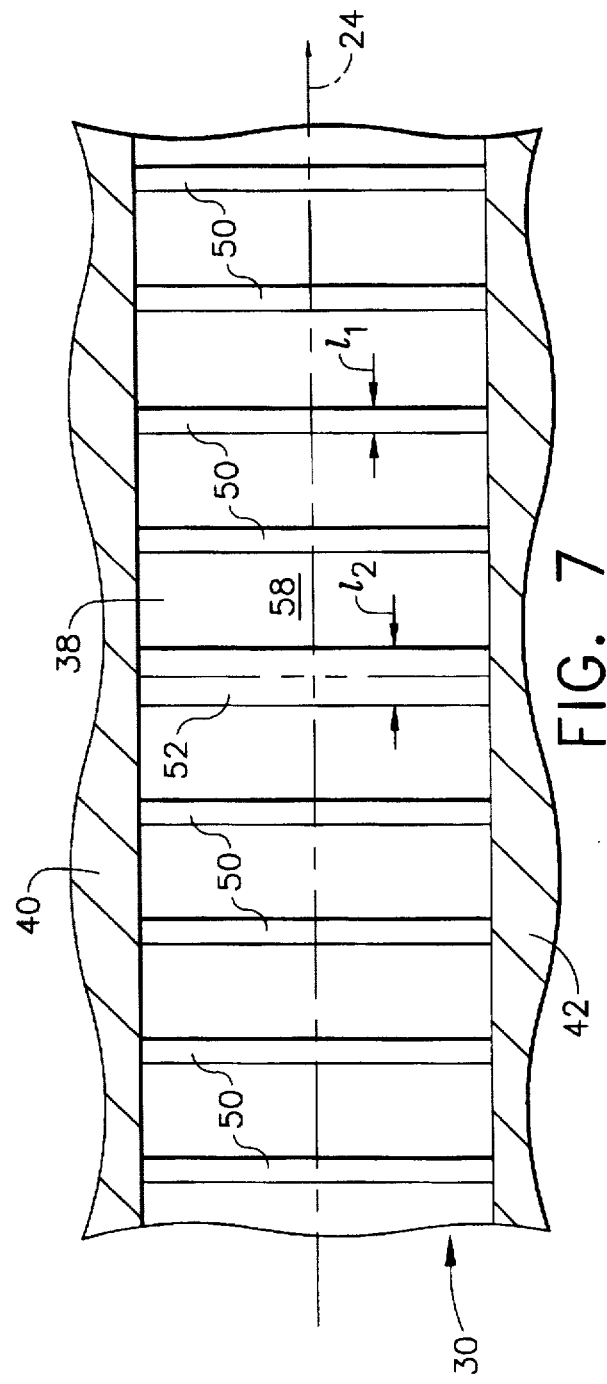

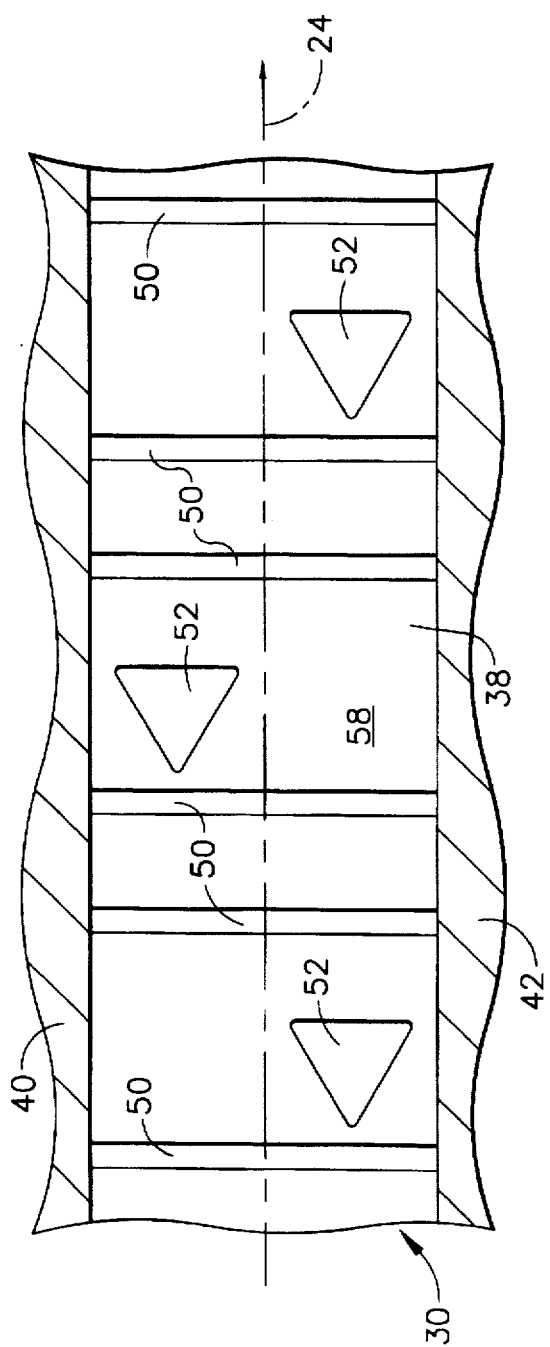
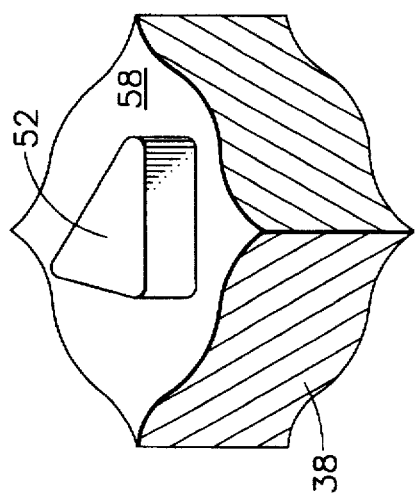
FIG. 8
FIG. 9

TURBULATOR CONFIGURATION FOR COOLING PASSAGES OF AN AIRFOIL IN A GAS TURBINE ENGINE

BACKGROUND OF THE INVENTION

1. Field of the Invention

The present invention relates generally to internal cooling of airfoils in a gas turbine engine and, in particular, to a turbulator configuration positioned along the inner surface of at least one wall defining a cooling passage in such an airfoil.

2. Description of Related Art

Gas turbine engines, such as aircraft jet engines, include components (e.g., turbines, compressors, fans and the like) having airfoils. An airfoil for a rotor blade, for example, has a shank portion which is attached to a rotating turbine rotor disk and an airfoil blade portion which is employed to extract useful work from the hot gases exiting the engine's combustor. The airfoil blade includes a blade root which is attached to the shank and a blade tip which is the free end of the airfoil blade. Modern aircraft jet engines have employed internal cooling of turbine rotor blades to keep the airfoil blade temperatures within certain design limits. Typically, the airfoil blade portion of the turbine rotor blade is cooled by air (normally bled from the engine's compressor) passing through a longitudinally extending internal passage, with the air entering near the airfoil blade root and exiting near the airfoil blade tip. Known turbine blade cooling passages include a cooling circuit comprising a plurality of unconnected longitudinally-oriented passages, where each passage receives cooling air from near the airfoil blade root and channels the air longitudinally toward the airfoil blade tip, as well as a serpentine cooling circuit comprising a plurality of longitudinally-oriented passages which are series-connected to produce serpentine flow. For either cooling circuit, some air exits the airfoil blade through film cooling holes near the airfoil blade's leading edge and some air exits the airfoil blade through trailing edge cooling holes.

Turbulence promoters or turbulators are devices commonly used in the cooling flow passages of rotor blades to break the thermal boundary layer and generate turbulence near the cooling passage wall. In this way, heat transfer between the coolant and the wall is enhanced. It is understood that the height and shape of the turbulators (heretofore rectangular or square ribs cast on the cooling passage wall identical in cross-section and spacing) are critical to the effectiveness of the turbulence generation. In particular, the turbulator height must be greater than the thickness of the thermal boundary layer in order to trip it.

It has been found that an airfoil cast with a ceramic core produced from a new core die usually has turbulators with the desired height and sharp corners as depicted in FIG. 4. In this instance, heat transfer between the coolant and the cooling passage wall can be enhanced by a factor of 2–3 when compared to a smooth surface without turbulators. The height and corners of the turbulators formed on the cooling passage wall will become eroded, however, after the core die is partially worn or through continuous impingement by particles contained in the coolant (as seen in FIG. 5), thereby adversely affecting the effectiveness of such turbulators. The core die may be refurbished several times before being replaced by a new core die, but this is costly in terms of expense and time.

Also, while turbulators may be designed to have a height greater than that required to trip the thermal boundary layer, and thus prolong the life of the core die, such turbulators can generate an excessive and undesirable pressure drop in the coolant fluid. It is imperative that the exit pressure of cooling air at the cooling holes exceed the pressure of the hot gases flowing over the blades (this difference in pressure being known as the backflow margin). If a positive backflow margin is not maintained, cooling air will not flow out of the blade and the hot gases may enter the blade through the cooling holes to reduce blade life. Since turbulators increase the pressure drop between the inlet and exit of the cooling passage while increasing the heat transfer between the coolant and the cooling passage surface, it is crucial that a turbulator configuration be developed which properly balances these competing factors.

Accordingly, it is desired that a turbulator configuration for integration with cooling passages in rotor blades of a gas turbine engine be developed which reduces the thickness of the thermal boundary layer along the inner surface of at least one of the cooling passage walls, whereby turbulence generation can be maintained even when the core die is partially worn without creating too large of a pressure drop within such cooling passage.

SUMMARY OF THE INVENTION

In accordance with one aspect of the present invention, a turbulator configuration formed on an inner surface of at least one wall of a cooling passage for a rotor blade in a gas turbine engine is disclosed, where the cooling passage has an upstream end, a downstream end, and a longitudinal axis therethrough. A flow of coolant passes through the cooling passage so as to define a core flow region located generally within a center area of the cooling passage and a thermal boundary layer located generally adjacent the inner surface of the walls forming the cooling passage. The turbulator configuration includes a first set of longitudinally spaced turbulators having a specified height and length for tripping the thermal boundary layer along the cooling passage wall to enhance heat transfer between the coolant and the wall, as well as a second set of longitudinally spaced turbulators having a specified height and length for generating turbulence in the core flow region of the cooling passage to reduce the thickness of the thermal boundary layer downstream therefrom. Accordingly, the height and length of the second set of turbulators will be greater than that of the first set of turbulators. Also, the spacing of the first and second set of turbulators with respect to each other will be optimized. The shape of the first and second turbulators may be varied and includes both two-dimensional and three-dimensional configurations.

In accordance with a second aspect of the present invention, a rotor blade for a gas turbine engine is disclosed as including a shank portion and an airfoil blade portion. The airfoil blade portion further includes a pressure side, a suction side, wherein the pressure and suction sides are joined together to form an airfoil shape, a blade root attached to the shank portion, a blade tip, and a longitudinal axis extending outward toward the blade tip and inward toward the blade root. Additionally, one or more walls define at least one generally longitudinally extending coolant passage in the airfoil blade portion, the walls having a plurality of first and second turbulators integrated with an inner surface thereof. The first turbulators have a first specified height and the second turbulators have a second specified height greater than the first turbulator specified height so that the second turbulators extend further radially inside the cooling passage than the first turbulators.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

FIG. 6 is an enlarged partial sectional view of the airfoil blade depicted in FIG. 3 taken through line 4—4 thereof, where the turbulator configuration of the present invention is shown;

FIG. 7 is an enlarged partial sectional view of the airfoil blade depicted in FIG. 3 taken through line 7—7 of FIG. 6;

FIG. 8 is an enlarged partial sectional view of the airfoil blade depicted in FIG. 3 taken through line 4—4, where a second embodiment of the turbulator configuration of the present invention is shown;

FIG. 9 is an enlarged partial side perspective view of the turbulator configuration depicted in FIG. 8;

DETAILED DESCRIPTION OF THE INVENTION

Figure 1:
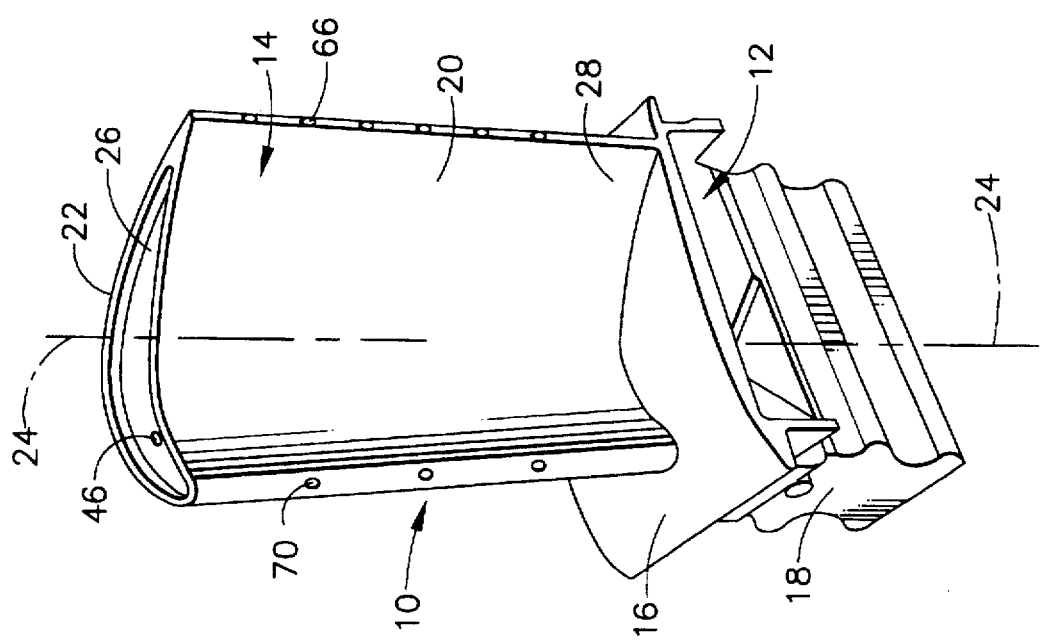
FIG. 1 is a perspective view of a rotor blade for a gas turbine engine.

Referring now to the drawing in detail, wherein identical numerals indicate the same elements throughout the figures, FIG. 1 depicts a gas turbine engine rotor blade 10 (e.g., an aircraft jet engine turbine rotor blade). Rotor blade 10 includes a shank 12 and an airfoil blade 14. Shank 12 further includes a blade platform 16, which helps to radially contain the turbine air flow, and a dovetail 18, which attaches to a turbine rotor disk (not shown). Airfoil blade 14 has a concave-shaped pressure side 20 and a convex-shaped suction side 22 which are joined together to define an airfoil shape. A longitudinal axis 24 extends radially outward toward a blade tip 26 and radially inward toward a blade root 28 which is attached to shank 12. Rotor blade 10 rotates in a direction such that airfoil blade pressure side 20 follows airfoil blade suction side 22. Thus, as shown in FIG. 1, rotor blade 10 would rotate into the page.

Figure 2:
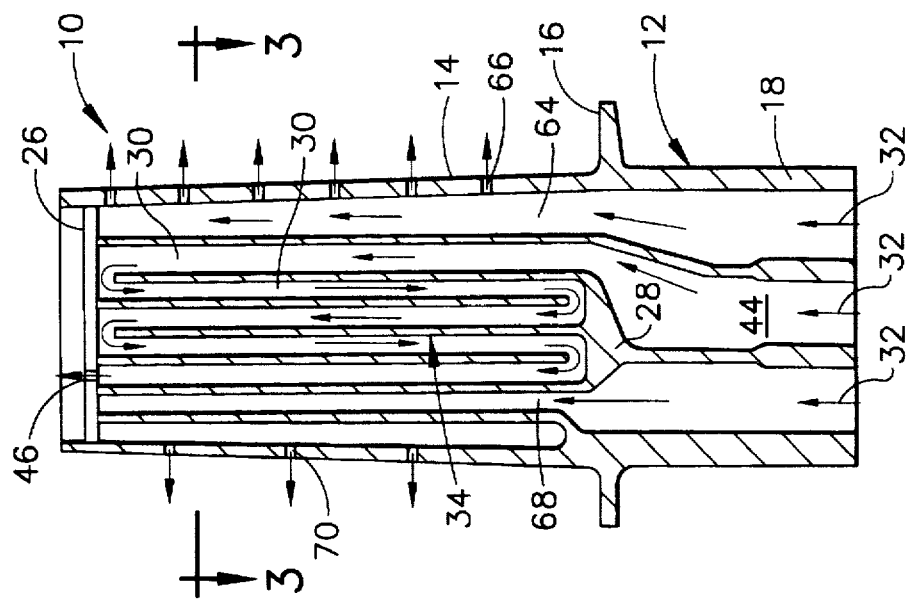
FIG. 2 is a longitudinal cross-sectional view of the rotor blade depicted in FIG. 1.
Figure 3:
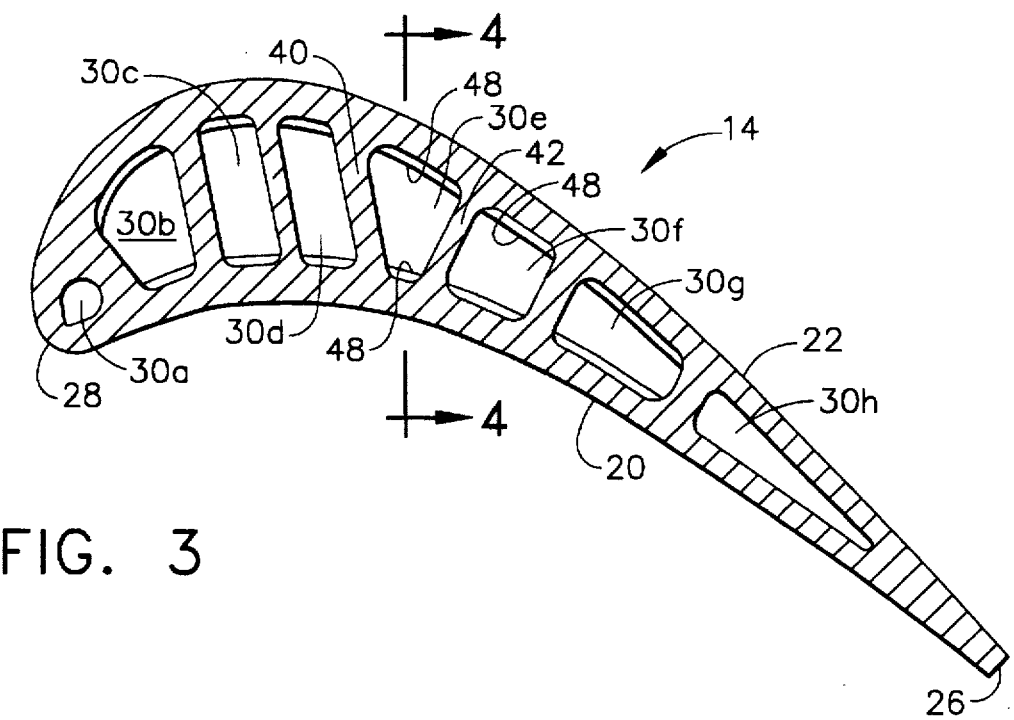
FIG. 3 is a cross-sectional view of the airfoil blade portion of the rotor blade depicted in FIG. 1 taken along line 3—3 of FIG. 2.

As seen in FIGS. 2 and 3, airfoil blade 14 includes a plurality of generally longitudinally extending internal cooling passages 30 which direct the flow of cooling air or coolant 32 (the direction of which is signified by unnumbered arrows) therethrough. Cooling passages 30 are preferably disposed in a row with adjacent passages interconnected to define at least a portion of a serpentine coolant circuit 34. It will be seen in FIG. 3 that each of passages 30a–30h has a unique cross-section, ranging from substantially rectangular to nearly trapezoidal, although the cross-section of such cooling passages 30 may have any shape. In the present airfoil blade shown and described, however, cooling passages 30 are substantially quadrilateral in shape with two pairs of opposing walls. A first pair of opposing walls 36 and 38 conform substantially in direction to pressure side 20 and suction side 22, respectively, of airfoil blade 14. A second pair of opposite walls 40 and 42 join walls 36 and 38 so as to form each passage 30. It will be recognized that cooling passages 30 of serpentine coolant circuit 34 receive coolant from an inlet 44 in shank 12. After coursing through cooling passages 30, the coolant exits airfoil blade 14 through holes 46 in blade tip 26.

Figure 4:
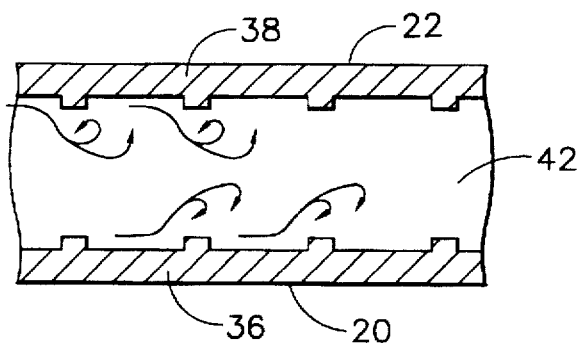
FIG. 4 is a partial sectional view of the airfoil blade depicted in FIG. 3 taken through line 4—4 thereof, where a prior turbulator configuration formed from a new core die is shown.
Figure 5:
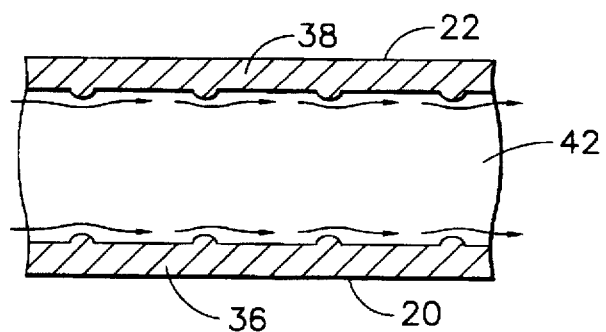
FIG. 5 is a partial sectional view of the airfoil blade depicted in FIG. 3 taken through line 4—4 thereof, where the prior turbulator configuration of FIG. 4 is shown when formed from a worn core die or eroded from particles within the coolant.
Figure 11:
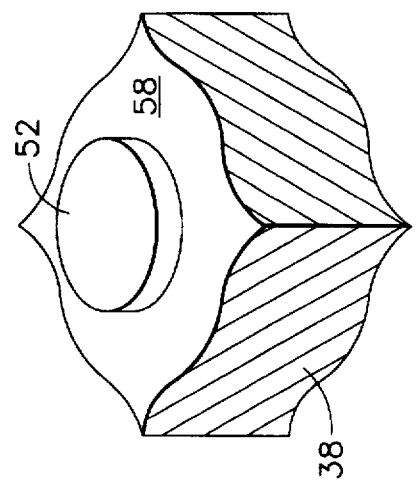
FIG. 11 is an enlarged partial side perspective view of the turbulator configuration depicted in FIG. 10.

As seen in FIGS. 4 and 5, a plurality of turbulators are typically positioned on one or more of walls 36, 38, 40, and 42 for each cooling passage 30. A further example is U.S. Pat. 4,514,144 to Lee (also owned by the assignee of the present invention and hereby incorporated herein), which discloses a turbulator configuration in which a plurality of longitudinally spaced turbulators are located on a pair of opposing walls in a cooling passage of a rotor blade and angled with respect to a centerline through the passage. As seen therein, however, the turbulators each have a substantially constant height so that they extend into the cooling passage a substantially constant amount. Also, such turbulators have a substantially constant shape and length. While the angled turbulators in the Lee patent are suitable for their intended purposes, it has been found that a new turbulator configuration is required in order to prolong the life of the core die utilized to form the internal construction of airfoil blade 14 and compensate for any erosion effects.

Figure 10:
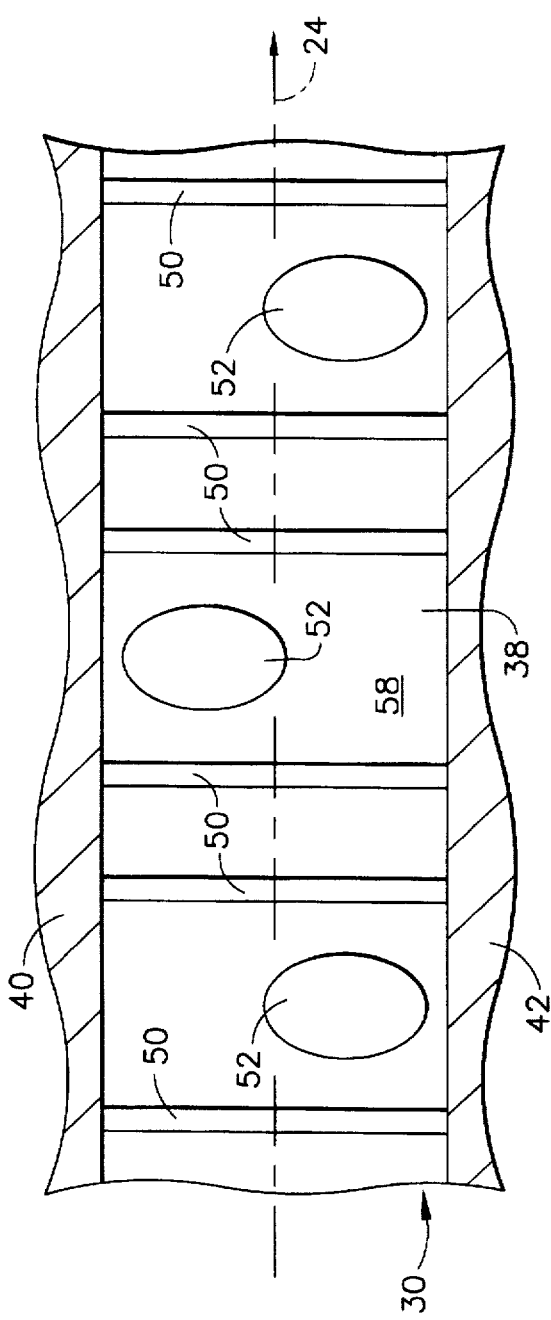
FIG. 10 is an enlarged partial sectional view of the airfoil blade depicted in FIG. 3 taken through line 4—4, where a third embodiment of the turbulator configuration of the present invention is shown.
Figure 12:
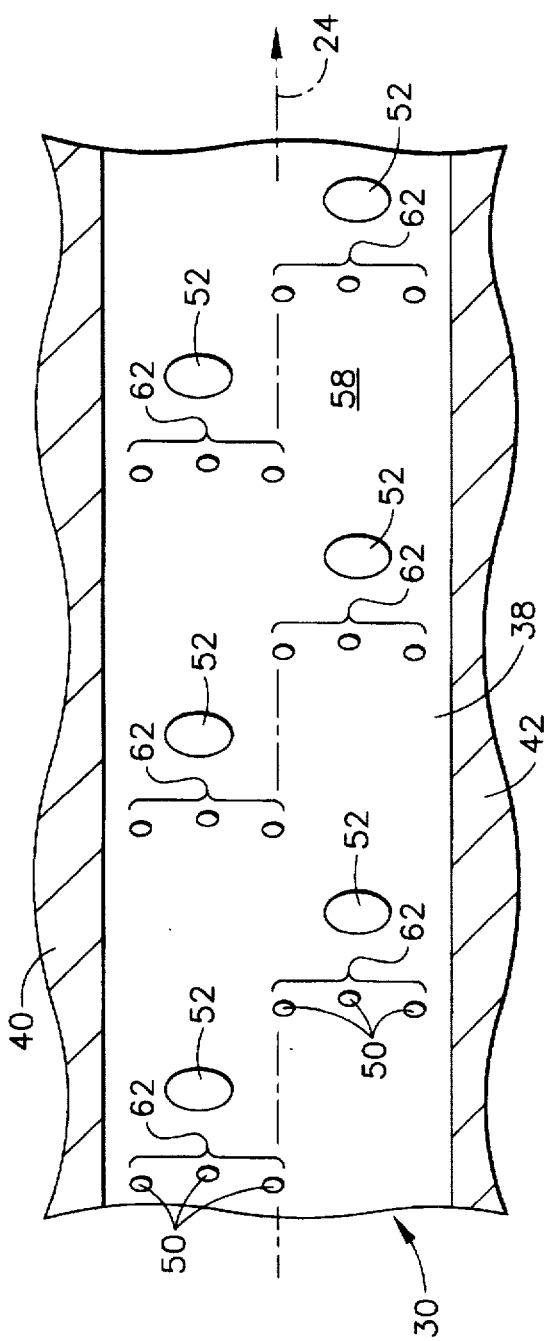
FIG. 12 is an enlarged partial sectional view of the airfoil blade depicted in FIG. 3 taken through line 4—4, where a fourth embodiment of the turbulator configuration of the present invention is shown.

In accordance with the present invention, a novel turbulator configuration, identified generally by the numeral 48, is provided on one or more walls of cooling passages 30a–h and preferably on each of walls 36, 38, 40, and 42 (although shown only on walls 36 and 38 of passages 30b–g in the figures). More specifically, as best seen in FIGS. 6 and 7, turbulator configuration 48 consists of at least two sets of longitudinally spaced turbulators 50 and 52 (although additional sets of turbulators may be provided as desired). It will be noted that first turbulators 50 preferably have a specified height $h_1$ (on the order of approximately 10–20 mils) which enables them to extend inwardly within cooling passage 30 so as to trip a thermal boundary layer 54 extending along the inner surface of each cooling passage wall (inner surfaces 56 and 58 of walls 36 and 38 being shown in FIG. 6). Thus, height $h_1$ of first turbulators 50 must be at least as great as the thickness of thermal boundary layer 54 and preferably slightly greater in order to enhance heat transfer between the cooling air and the cooling passage wall. First turbulators 50 will also preferably have a specified length $l_1$ which enables them to extend longitudinally along the inner surface of each cooling passage wall. As seen in FIG. 7, first turbulators 50 may take the form of two-dimensional ribs extending substantially across the inner surface of the applicable wall (inner surface 56 of wall 36 being shown). Alternatively, first turbulators 50 may consist of a plurality of circumferentially spaced two or three-dimensional elements (e.g., ribs depicted in FIG. 8 and 10 or cylinders as depicted in FIG. 12).

Second turbulators 52 likewise preferably have a specified height $h_2$ (on the order of approximately 20–150 mils) which enables them to extend inwardly within cooling passage 30 so as to generate turbulence in a core flow region 60 of coolant passing therethrough. It will be understood that the dimensions for core flow region 60 will vary depending on several factors (as will the thickness of thermal boundary layer 54), but generally will involve a central region of cooling passage 30. Nevertheless, height $h_2$ of second turbulators 52 must be great enough so that second turbulators 52 extend at least partially into core flow region 60. By generating turbulence within core flow region 60, the thickness of thermal boundary layer 54 is diminished downstream therefrom. This reduction in the thickness of thermal boundary layer 54 then compensates for a certain amount of wear on the core die used to form first turbulators 50, as well as a degree of other erosion thereon.

Second turbulators 52 also preferably have a specified longitudinal length $l_2$ so that they extend longitudinally along the wall of cooling passage 30. As with first turbulators 50, second turbulators 52 may have a two-dimensional rib form which extends substantially across the inner surface of the wall (inner surface 56 of wall 36 being shown in FIG. 7). Alternatively, second turbulators 52 may consist of three-dimensional shapes (as shown in FIGS. 8–13) which preferably are staggered along the inner surface.

It will further be seen that the relative height, length, and spacing for first and second turbulators 50 and 52 are crucial for a given application. While heights $h_1$ and $h_2$ of first and second turbulators 50 and 52 are dictated primarily by the thickness of thermal boundary layer 54 and the position of core flow region 60, it should be noted that height $h_2$ generally will be approximately 2–4 times greater than height $h_1$. Likewise, longitudinal lengths $l_1$ and $l_2$ of first and second turbulators 50 and 52 will have a similar preferred relation where longitudinal length $l_2$ is approximately 2–4 times greater than longitudinal length $l_1$.

With respect to the relative spacing of first and second turbulators 50 and 52, it will be seen on inner surface 58 of wall 38 in FIG. 6 that a predetermined number of first turbulators 50 will preferably be positioned between adjacent second turbulators 52. Once again, while the number of first turbulators 50 located between adjacent second turbulators 52 will vary depending upon conditions such as the speed of coolant flow through cooling passage 30, it will generally be in a range of approximately 2–5. Additionally, it will be noted that the positioning of second turbulators 52 on inner surfaces 56 and 58 of opposing walls 36 and 38 is such that they are staggered (i.e., substantially 180° out of phase).

Figure 13:
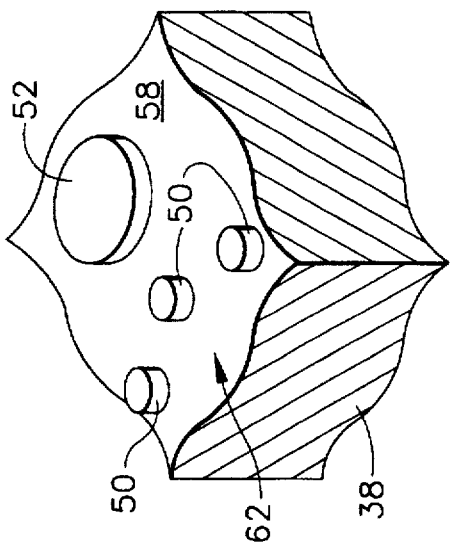
FIG. 13 is an enlarged partial side perspective view of the turbulator configuration depicted in FIG. 12.

While three-dimensional second turbulators 52 are shown with two-dimensional first turbulators 50 in FIGS. 8–11, another alternative arrangement of first and second turbulators 50 and 52 is depicted in FIGS. 12 and 13. As seen therein, second turbulators 52 have a three-dimensional (e.g., cylindrical) shape with a group 62 of three-dimensional first turbulators 50 being positioned downstream from each second turbulator. Due to the relative heights of first and second turbulators 50 and 52, it is preferred that second turbulators 52 be staggered across the inner surface of the applicable cooling passage wall and the group 62 of first turbulators 50 associated with each such second turbulator 52 be located so as not to be directly aligned therewith. Otherwise, the effect group 62 of first turbulators 50 has on thermal boundary layer 54 is minimized.

Although not a part of the present invention, rotor blade 10 also includes trailing edge and leading edge cooling circuits with coolant entering a trailing edge conduit 64 and exiting through trailing edge openings 66 and with coolant entering a leading edge conduit 68 and exiting through leading edge film cooling hole openings 70.

Having shown and described the preferred embodiment of the present invention, further adaptations of the turbulator configuration for cooling passages in an airfoil can be accomplished by appropriate modifications by one of ordinary skill in the art without departing from the scope of the invention.

What is claimed is:

1. In a cooling passage of a rotor blade having an upstream end, a downstream end, and a longitudinal axis therethrough, wherein a flow of coolant passes through said cooling passage so as to define a core flow region located generally within a center area of said cooling passage and a thermal boundary layer located generally adjacent an inner surface of each wall forming said cooling passage, a turbulator configuration being formed on at least one of said cooling passage inner surfaces, comprising:

(a) a first set of longitudinally spaced turbulators having a specified height and length for tripping said thermal boundary layer along said cooling passage inner surface to enhance heat transfer between said coolant and said cooling passage wall; and (b) a second set of longitudinally spaced turbulators having a specified height and length for generating turbulence in said core flow region of said cooling passage to reduce the thickness of said thermal boundary layer downstream therefrom.

2. The turbulator arrangement of claim 1, wherein the height of said second set of turbulators is approximately 2–4 times greater than the height of said first set of turbulators.

3. The turbulator arrangement of claim 1, wherein the length of said second set of turbulators is approximately 2–4 times greater than the length of said first set of turbulators.

4. The turbulator arrangement of claim 1, each of said first set of turbulators further comprising a two-dimensional rib.

5. The turbulator arrangement of claim 1, each of said second set of turbulators further comprising a two-dimensional rib.

6. The turbulator arrangement of claim 1, each of said first set of turbulators further comprising a three-dimensional shape.

7. The turbulator arrangement of claim 6, wherein each of said first set of turbulators is a cylinder.

8. The turbulator arrangement of claim 6, wherein each of said first set of turbulators is a triangular prism.

9. The turbulator arrangement of claim 1, each of said second set of turbulators further comprising a three-dimensional shape.

10. The turbulator arrangement of claim 9, wherein each of said second set of turbulators is a cylinder.

11. The turbulator arrangement of claim 9, wherein each of said second set of turbulators is a triangular prism.

12. The turbulator arrangement of claim 9, wherein said second set of turbulators are spaced circumferentially along said cooling passage wall.

13. The turbulator arrangement of claim 9, each of said first set of turbulators further comprising a three-dimensional shape.

14. The turbulator arrangement of claim 13, wherein a group of said first set turbulators are positioned immediately downstream of each said second set turbulator.

15. The turbulator arrangement of claim 14, wherein each said group of said first set turbulators are not directly aligned with the second set turbulator immediately upstream thereof.

16. The turbulator arrangement of claim 1, wherein a predetermined number of said first set turbulators is positioned between adjacent turbulators of said second set.

17. The turbulator arrangement of claim 16, wherein the predetermined number of said first set turbulators positioned between adjacent turbulators of said second set is approximately 2-5.

18. A rotor blade for a gas turbine engine, comprising:

(a) a shank portion; and (b) an airfoil blade portion, said airfoil blade portion further comprising:

(1) a pressure side;

(2) a suction side, said pressure and suction sides being joined together to form an airfoil shape;

(3) a blade root attached to said shank portion;

(4) a blade tip;

(5) a longitudinal axis extending outward toward said blade tip and inward toward said blade root; and (6) one or more walls defining at least one generally longitudinally extending coolant passage, said walls having a plurality of first and second turbulators integrated with an inner surface thereof, wherein said first turbulators have a first specified height and said second turbulators have a second specified height greater than said first turbulator specified height so that said second turbulators extend further into said cooling passage than said first turbulators.

* * * * *